United States Patent [19]

Sakamoto et al.

[11] Patent Number: 4,950,967
[45] Date of Patent: Aug. 21, 1990

[54] SERVOMOTOR CONTROL APPARATUS

[75] Inventors: Keiji Sakamoto, Hachioji; Shinji Seki, Kokubunji; Yasusuke Iwashita, Oshino, all of Japan

[73] Assignee: Fanuc Ltd., Minamitsuru, Japan

[21] Appl. No.: 337,612

[22] PCT Filed: Aug. 31, 1988

[86] PCT No.: PCT/JP88/00867
§ 371 Date: Apr. 3, 1989
§ 102(e) Date: Apr. 3, 1989

[87] PCT Pub. No.: WO89/02185
PCT Pub. Date: Mar. 9, 1989

[30] Foreign Application Priority Data

Aug. 31, 1987 [JP]  Japan ................ 62-217344

[51] Int. Cl.$^5$ .......................................... G05B 19/10
[52] U.S. Cl. ................................. 318/567; 318/561; 318/615; 318/616
[58] Field of Search ............... 318/567, 561, 615, 616

[56] References Cited

U.S. PATENT DOCUMENTS

| | | | |
|---|---|---|---|
| 4,680,518 | 7/1987 | Kurakake et al. | 318/561 |
| 4,695,780 | 9/1987 | Kurakake et al. | 318/561 |
| 4,816,734 | 3/1989 | Kurakake et al. | 318/615 |
| 4,851,754 | 7/1989 | Sakamoto et al. | 318/616 |

*Primary Examiner*—Bernard Roskoski
*Assistant Examiner*—Saul M. Bergmann
*Attorney, Agent, or Firm*—Staas & Halsey

[57] ABSTRACT

The invention provides a servomotor control apparatus which performs standard mode-type velocity control. An acceleration signal is formed by a differential computation or difference computation, from a velocity signal fed back from a servomotor. An acceleration value of the servomotor (d) is estimated by a criterion model (2) of a velocity control system utilizing a current command T(S) formed in a velocity control loop. The computed acceleration and the estimated acceleration are compared and the current command T(S) is corrected in conformity with the results of the comparison.

3 Claims, 2 Drawing Sheets

SERVOMOTOR CONTROL APPARATUS

BACKGROUND OF THE INVENTION

This invention relates to a servomotor control apparatus having improved characteristics, such as a frequency response characteristic.

DESCRIPTION OF THE RELATED ART

In servomotor velocity control, ordinarily it is so arranged that a velocity signal fed back from the servomotor is compared with a velocity command. FIG. 4 is a block diagram of an example of such a conventional control system in a case where disturbances are neglected. In FIG. 4, A represents an integration term having an integration gain $K_1$, B represents a proportion term having a proportional gain $K_2$, C represents a current amplification term of torque constant $K_T$, and D represents a motor term which includes motor rotor inertia $J_M$ and a constant $\beta$ indicating load inertia. Further, S represents an integration operator.

With this velocity control system, the sum of the result of integrating an error signal between a velocity command $V(s)$ and motor velocity $W(s)$ by $K_1/S$ of the integration term and the result of feeding back the motor velocity $W(s)$ through the proportional gain $K_2$ of the proportion term B is applied to the motor D as a torque command $T(s)$ (current command).

In such a velocity control system, a time delay develops in the response of the torque command $T(s)$ owing to the integration term A, and instability occurs such as control system oscillation when the system gain is enlarged. More specifically, the system cannot quickly follow up rapid changes in the commanded velocity $V(s)$, and oscillation is produced particularly when the motor is controlled to be brought to a stop.

SUMMARY OF THE INVENTION

The present invention has been devised in order to solve the foregoing problems and its object is to provide a servomotor control apparatus in which frequency response is raised and velocity can be stably controlled by mitigating the effects of disturbances and fluctuations in the load.

In accordance with the invention, there is provided a servomotor control apparatus having a velocity control loop which includes a control criterion model for performing standard model-type control with regard to a servomotor. The servomotor control apparatus includes means for forming an acceleration signal by differentiating a velocity signal fed back from the motor, means for estimating an acceleration value of the servomotor using a current command output by the velocity control loop, means for obtaining an error between the acceleration signal and the estimated acceleration value, and means for correcting the current command by the error signal.

Accordingly, the servomotor control apparatus of the present invention compares a computed acceleration and the estimated acceleration and enables the current command to be corrected in conformity with the results of the comparison to stabilize velocity control.

DESCRIPTION OF THE PREFERRED EMBODIMENT

An embodiment of the present invention will now be described in detail with reference to the drawings.

Since model standard-type adaptive control is used in the present invention, the principle of control will be described first.

Figure 3:
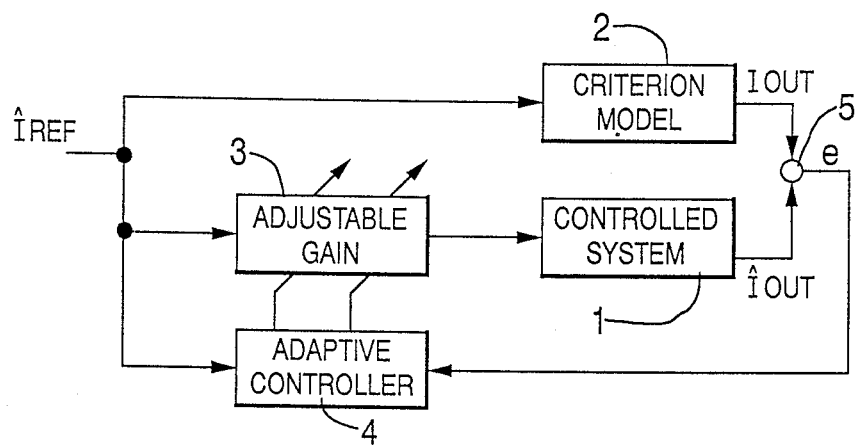
FIG. 3 is a block diagram of a parallel-type model standard control.

FIG. 3 is a block diagram of an example of parallel-type model standard control. As shown in FIG. 3, a criterion model 2 is arranged in parallel with a controlled system 1. An adjustable gain 3 provided ahead of the controlled system 1 is adaptively corrected during operation of the controlled system 1. Gain control is performed by an adaptive controller 4 in conformity with the output of an arithmetic unit 5 in such a manner that an output $\hat{I}_{OUT}$ of the controlled system 1 will follow up an output $I_{OUT}$ of the criterion model 2. $I_{REF}$ represents a command signal, and E denotes an error signal. Such model standard-type adaptive control is advantageous in that adaptive control of the control system can be performed with a quick response.

Figure 1:
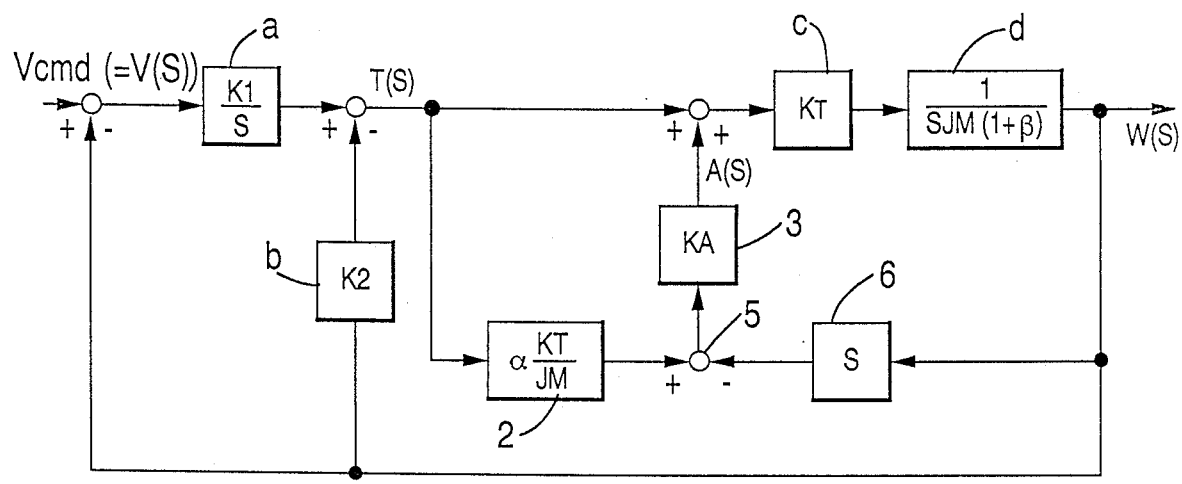
FIG. 1 is a block diagram of an embodiment of the invention having a standard model-type velocity control loop.
Figure 4:
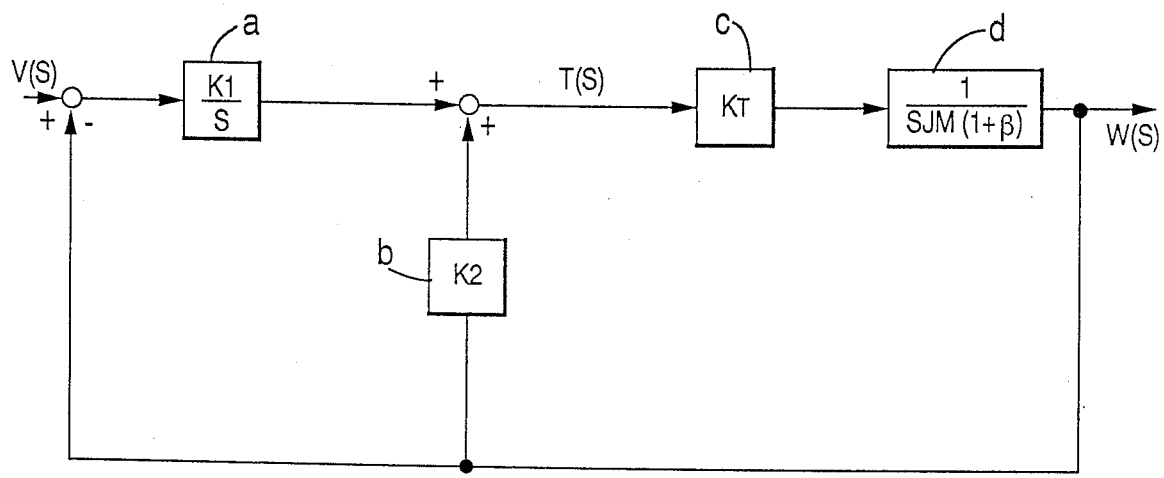
FIG. 4 is a block diagram of a conventional velocity control loop.

FIG. 1 is a block diagram of an embodiment of the present invention. Portions identical with those of FIGS. 3 and 4 are designated by like reference characters and a description thereof is deleted: This embodiment of the invention has a model standard-type velocity control loop and is characterized in that a coefficient $\alpha$ of the criterion model 2 of the velocity control system is set to a value at which the cut-off frequency and damping coefficient of the velocity control loop will be made equal to what they are when a corrective gain coefficient $K_A=0$ is maintained. The corrective gain $K_A$ is provided as the adjustable gain 3. That is, along with the velocity feedback loop, an acceleration feedback loop is formed by providing an arithmetic unit 6 having the differentiation operator s to differentiate the motor velocity $W(s)$. Acceleration is estimated by the criterion model 2 based on the current command $T(s)$. The acceleration is compared with the fed back acceleration signal by the arithmetic unit 5 to correct the current command $T(s)$.

Described next will be a transfer function $H(s) = W(s)/V(s)$ in the control loop of FIG. 1.

In FIG. 1, the relationship among a velocity command $V_{cmd}$ (=$V(s)$), torque command $T(s)$, corrective torque signal $A(s)$ and motor velocity $W(s)$ is as follows:

$$T(s) = (K_1/S)V(s) - \{(K_1/S) + K_2\}W(s)$$

$$A(s) = K_A\{(\alpha K_T/J_M)T(s) - SW(s)\}$$

$$W(s) = (K_T\{SJ_M(1+\beta)\})\{T(s) + A(s)\}$$

The transfer function $H(s)$ is as follows:

$$H(s) = K_T K_1 \{1 + \alpha K_A K_T/J_M\}/(\{J_M(1+\beta) + K_T K_A\}S^2 + K_T K_2 \qquad (1)$$
$$\{1 + (\alpha K_A K_T/J_M)\}S + K_T K_1\{1 + (\alpha K_A K_T/J_M)\})$$

(A) With respect to the transfer function $H_0(s)$ when the corrective gain $K_A=0$ this corresponds to the conventional example shown in FIG. 4, that is, an arrangement in which there is no acceleration feedback system. Assuming that the transfer function $H_0(s)=W(s)/V(s)$, we have $$H_0(s) = (K_T K_1)/\{J_M(1+\beta)S^2 + K_T K_2 S + K_T K_1\} \qquad (2)$$

Here the integration term A and proportion term B are adjusted in conformity with the load inertia ratio, so that we have $$K_1 = (1+\beta_0)K_{10}, \quad K_2 = (1+\beta_0)K_{20}$$

where $\beta_0$: constant corresponding to the load inertia ratio

If the constant $\beta$ indicating the load inertia is as follows:

$$\beta = \beta_0$$

Eq. (2) can be expressed as follows:

$$\begin{aligned} H_0(s) &= K_T K_{10}/(1+\beta_0)/\{J_M(1+\beta_0)S^2 + \\ & \quad K_T(1+\beta_0)K_{20}S + K_T K_{10}(1+\beta_0)\} \\ &= \omega n^2/(S^2 + 2\zeta\omega n S + \omega n^2) \end{aligned} \qquad (3)$$

where $(K_T K_{10})/J_M = \omega n^2$, $(K_T/J_M)K_{20} = 2\zeta\omega n$.

(B) With respect to the transfer function $H(s)$, when the corrective gain $K_A \neq 0$ and the coefficient $\alpha=0$, here system operation will be described when the conventional velocity feedback system is provided solely with the acceleration feedback function shown in FIG. 1. Assuming that the transfer function is $H(s)=W(s)/V(s)$, we have $$H(s) = (K_T K_1)/(\{J_M(1+\beta) + K_T K_A\}S^2 + K_T K_2 S + K_T K_1) \qquad (4)$$

This indicates that, in comparison with Eq. (2), the provision solely of acceleration feedback is equivalent to effecting a pseudo-increase in motor rotor inertia.

(C) With respect to the transfer function $H(s)$, when the corrective gain $K_A \neq 0$ and the coefficient $\alpha \neq 0$.

This corresponds to a case where model standard control shown in FIG. 1 is provided with acceleration feedback. By making the criterion mode coefficient $\alpha$ equal to $1/(1+\beta)$, the behavior exhibited is the same as that in the conventional velocity control system with respect to the velocity command, and the apparent motor rotor inertia is enlarged so that the system presents improved stability. That is, the transfer function $H(s)$ becomes as follows, where the substitution $(\alpha K_T/J_M)=\alpha'$ is made in Eq. (1):

$$H(s) = K_T K_1\{1 + \alpha' K_A\}/(\{J_M(1+\beta) + K_T K_A\}S^2 +$$

-continued
$$\{K_T K_{20}(1+\beta_0)(1 + K_A\alpha')S\} + \{K_T K_{10}(1+\beta_0)(1 + \alpha' K_A)\})$$

Next, when $K_A$ is decided in such a manner that $K_T K_A/J_M(1+\beta)=P$ holds, namely when the apparent rotor inertia becomes $(1+P)$ times larger, $\alpha$ becomes as follows from $K_a\alpha'=P$ $$\alpha = 1/(1+\beta)$$

Accordingly, the transfer function $H(s)$ is $$\begin{aligned} H(s) &= K_T K_{10}(1+\beta_0)(1+P)/[J_M(1+\beta)(1+P)S^2 + \\ & \quad K_T K_{20}(1+\beta_0)(1+P)S + K_T K_{10}(1+\beta_0)(1+P)] \\ &= \{K_T K_{10}(1+\beta_0)\}/(J_M(1+\beta)S^2 + \\ & \quad K_T K_{20}(1+\beta_0)S + K_T K_{10}(1+\beta_0)) \end{aligned} \qquad (5)$$

More specifically, by setting $\alpha$ to be equal to $1/(1+\beta)$, Eq. (5) is such that the velocity loop exhibits the same behavior as when $K_A=0$ (the prior-art example) with respect to the velocity command $V(s)$, and the apparent motor rotor inertia becomes larger at the same time so that the velocity loop exhibits improved velocity control system stability.

Figure 2:
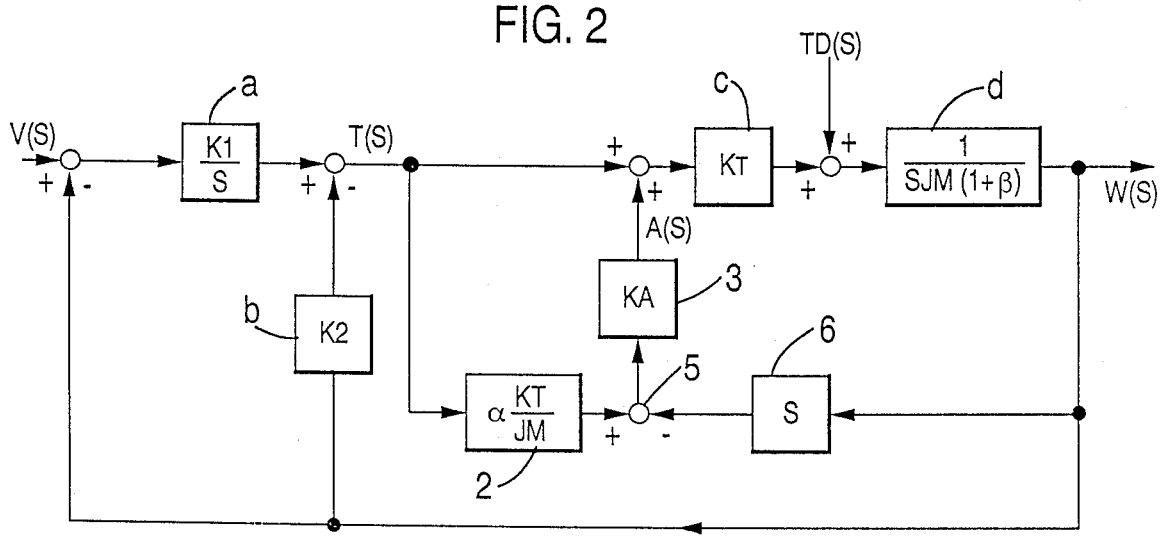
FIG. 2 is a block diagram of a velocity control system which takes the effects of disturbances into account.

FIG. 2 is a block diagram of a velocity control system that takes the influence of disturbance into account. Before investigating the effects of disturbance, the influence of a change in inertia on the transfer function will be considered.

Described first will be the influence of a fluctuation in inertia on the transfer function $H(s)$ when the motor inertia coefficient $\beta$ is represented by $\beta(s)$. The transfer coefficient $H(s)$ may be written as follows from Eq. (1):

$$H(s) = K_T K_{10}(1 + \alpha' K_A)(1+\beta_0)/(J_M(1+\beta(s)) + K_T K_A)S^2 +$$
$$K_T K_{20}(1+\beta_0)(1 + K_A\alpha')S + K_T K_{10}(1+\beta_0)(1 + \alpha' K_A)]$$

The influence of the fluctuation in inertia on the transfer function $H(s)$ is evaluated by the following equation:

$$\{\partial H(s)/\partial \beta(s)\} = \qquad (6)$$
$$\{-K_T K_{10}(1 + \alpha' K_A)J_M S^2(1+\beta_0)/[\{J_M(1+\beta(s)) + K_T K_A\}S^2 +$$
$$K_T K_{20}(1+\beta_0)(1 + K_A\alpha')S + K_T K_{10}(1+\beta_0)(1 + \alpha' K_A)]^2$$

If $K_A=0$ holds, we have the following from Eq. (2):

$$\{\partial H_0(s)/\partial \beta(s)\} = \{-K_T K_{10}(1+\beta_0)J_M S^2/\{J_M(1+\beta(s))S^2 + \qquad (7)$$
$$K_T K_{20}(1+\beta_0)S + K_T K_{10}(1+\beta_0)\}^2$$

Next, the following is obtained from Eqs. (6), (7):

$$G_f(s) = \{\partial H(s)/\partial \beta(s)\}/\{\partial H_0(s)/\partial \beta(s)\} \qquad (8)$$

If the coefficient $\alpha$ of the criterion model is made equal to $1/(1+\beta_1)$, as mentioned earlier, then we will have the following since $K_A = P(1+\beta_1) \times (J_M/K_T)$ $$K_A\alpha' = K_A \times (K_T/J_M)\alpha$$
$$= P(1 + \beta_1)(J_M/K_T)(K_T/J_M)\{1/(1 + \beta_1)\}$$
$$= P$$

Though $\beta(s)$ fluctuates in the vicinity of $\beta_1$, we arrive at the following if the range of fluctuation is neglected and $1+\beta(s)=1+\beta_1$ is assumed to hold:

$$G_f(s) = \{J_M(1 + \beta_1)S^2 + \tag{9}$$
$$K_T K_{20}(1 + \beta_0)S + K_T K_{10}(1 + \beta_0)\}^2 \times$$
$$(1 + P)/(1 + P)^2 \{J_M(1 + \beta_1)S^2 +$$
$$K_T K_{20}(1 + \beta_0)S + K_T K_{10}(1 + \beta_0)\}^2$$
$$= 1/(1 + P)$$

Eq. (9) indicates that when the corrective gain $K_A$ is determined in such a manner that the motor rotor inertia becomes $(1+P)$ times larger and $\alpha$ is determined in such a manner that the cut-off frequency and damping coefficient of the velocity control system become equal to what they will be at $K_A=0$, the influence of the change in load inertia upon the change in the velocity loop transfer function can be reduced to a value which is $1/(1+P)$ times as much.

The influence of a variation in torque upon output velocity will now be considered on the basis of a transfer function for a case where a torque disturbance $T_D(s)$ is taken into account in FIG. 2.

If it is assumed that a torque command $T(s)=(K_1/S)V(s)-\{(K_1/S)+K_2\}W(s)$, a torque command signal $A(s)=K_A\{(\alpha K_T/J_M)T(s)-SW(s)\}$ and a motor velocity $W(s)=(1/\{SJ_M(1+\beta)\})(T_D(s)+K_T\{T(s)+A(s)\})$, then the following equation will hold with regard to motor velocity $W(s)$:

$$W(s) = (1/\{SJ_M(1 + \beta)\}) \times \tag{10}$$
$$(T_D(s) + K_T T(s) + K_A\{(\alpha K_T/J_M)T(s) - SW(s)\})$$

Solving Eq. (10) with regard to motor velocity $W(s)$, we have $$W(s) = (K_T K_{10}(1 + \beta_0)(1 + K_A\alpha')V(s) + \tag{11}$$
$$ST_D(s))/(\{J_M(1 + \beta) + K_A K_T\}S^2 +$$
$$K_T K_{20}(1 + \beta_0)(1 + K_A\alpha')S + K_T K_{10}(1 + \beta_0)(1 + K_A\alpha'))$$

The manner in which the motor velocity $W(s)$ varies due to a change in torque disturbance $T_D(s)$ will now be investigated based on the foregoing. Specifically, we have $$\{\partial W(s)/\partial T_D(s)\} = S/\{J_M(1 + \beta) + K_A K_T\}S^2 + \tag{12}$$
$$K_T K_{20}(1 + \beta_0)(1 + K_A\alpha')S + K_T K_{10}(1 + \beta_0)(1 + K_A\alpha'))$$

Letting $W_0(s)$ represent motor velocity when $K_A=0$ prevails, we have $$W_0(s) = \{K_T K_{10}(1 + \beta_0)V(s) + ST_D(s)\}/\{J_M(1 + \beta)S^2 + \tag{13}$$
$$K_T K_{20}(1 + \beta_0)S + K_T K_{10}(1 + \beta_0)\}$$

Therefore, $$\{\partial W_0(s)/\partial T_D(s)\} = T_D(s)/\{J_M(1 + \beta) S^2 + \tag{14}$$
$$K_T K_{20}(1 + \beta_0)S + K_T K_{10}(1 + \beta_0)\}$$

Accordingly, we have the following from Eqs. (12), (14):

$$G_{TD}(s) = \{\partial W(s)/\partial T_D(s)\}/\{\partial W_0(s)/\partial T_D(s)\} \tag{15}$$
$$= \{J_M(1 + \beta)S^2 + K_T K_{20}(1 + \beta_0)S +$$
$$K_T K_{10}(1 + \beta_0)\}/(\{J_M(1 + \beta) + K_A K_T\}S^2 +$$
$$K_T K_{20}(1 + \beta_0)(1 + K_A\alpha')S +$$
$$K_T K_{10}(1 + \beta_0)(1 + K_A\alpha'))$$

Accordingly, if the coefficient $\alpha$ of the criterion model is made equal to $1/(1+\beta)$ and $K_A = P(1+\beta)(J_M/K_T)$ holds, then we have $$G_{TD}(s) = \{J_M(1 + \beta)S^2 + K_T K_{20}(1 + \beta_0)S + \tag{16}$$
$$K_T K_{10}(1 + \beta_0)\}/(1 + P)\{J_M(1 + \beta)S^2 +$$
$$K_T K_{20}(1 + \beta_0)S + K_T K_{10}(1 + \beta_0)\}$$
$$= 1/(1 + P)$$

Eq. (9) indicates that when the corrective gain $K_A$ is determined in such a manner that the motor rotor inertia becomes $(1+P)$ times larger and $\alpha$ is determined in such a manner that the cut-off frequency and damping coefficient of the velocity control system become equal to what they are when $K_A=0$ holds, the influence of the change in load inertia upon the change in the velocity loop transfer function can be reduced to a value which is $1/(1+P)$ times as much.

Though an embodiment of the invention has been described, the invention is not limited thereto but can be modified in various ways without departing from the scope of the claims.

The servomotor control apparatus of the present invention is such that the velocity control system of a servomotor is provided with a loop which forms an acceleration signal by differentiating motor velocity, acceleration serving as a model criterion is specified using a current command, this estimated value and an acceleration signal are compared and the current command is corrected. As a result, frequency response is improved and the influence of disturbance and torque variation can be diminished to make stable control possible.

We claim:

1. A servomotor control apparatus having a velocity control loop which includes a control criterion model for performing standard model-type control with regard to a servomotor, comprising:
means for forming an acceleration signal by differentiating a velocity signal fed back from said motor;
means for estimating an acceleration value of the servomotor using a current command output by the velocity control loop;
means for obtaining an error between said acceleration signal and the estimated acceleration value and outputting an error signal; and means for correcting said current command in accordance with said error signal.

2. A servomotor control apparatus according to claim 1, wherein a corrective gain is provided with respect to the error between said acceleration signal and the estimated acceleration value, said error signal being obtained by setting a corrective gain coefficient $K_A$ in conformity with a fluctuation in load inertia.

3. A servomotor control apparatus according to claim 2 wherein said means for estimating the acceleration value of said servomotor employs a control criterion model of $\alpha \cdot (K_T/J_M)$, where $K_T$ represents a torque constant and $J_M$ represents motor rotor inertia, the coefficient $\alpha$ being set to a value at which a cut-off frequency and damping coefficient of the velocity control loop will be made equal to what they are when the corrective gain coefficient is $K_A = 0$.

* * * * *

UNITED STATES PATENT AND TRADEMARK OFFICE
CERTIFICATE OF CORRECTION

PATENT NO. : 4,950,967
DATED : AUGUST 21, 1990
INVENTOR(S) : KEIJI SAKAMOTO ET AL.

It is certified that error appears in the above-identified patent and that said Letters Patent is hereby corrected as shown below:

FRONT PAGE [57] Abstract
    line 8, "T(S)" should be --T(s)--;
    line 10, "T(S)" should be --T(s)--.

Col. 2, line 9, "control;" should be --control; and--;
    line 37, "deleted:" should be --deleted.--;
    line 65, "$(K_T\{SJ_M$" should be --$(K_T/\{SJ_M$--.

Col. 3, line 33, "$K_TK_{10}/(1$" should be --$K_TK_{10}(1$--;

line 47, "$(K_TK_1)($" should be --$(K_TK_1)/($--;

line 54, "0." should be --0,--;
line 55, "This" should be --this--.

Col. 4, line 42, "$/(J_M$" should be --$/(\{J_M$--;

line 43, ")]" should be --))--;

line 50, "/[{" should be --/({--;

line 51, "$)]^2$" should be --$))^2$--;

UNITED STATES PATENT AND TRADEMARK OFFICE
CERTIFICATE OF CORRECTION

PATENT NO. : 4,950,967

DATED : AUGUST 21, 1990

INVENTOR(S) : SEIJI SAKAMOTO ET AL.

It is certified that error appears in the above-identified patent and that said Letters Patent is hereby corrected as shown below:

Col. 4, line 56, "{" (second occurrence) should be deleted;

line 56, "/{$J_M$" should be --/({$J_M$--; and

"))$S^2$" should be --)}$S^2$--;

line 57, "$B_0$)}$^2$" should be --$B_0$))$^2$--.

Col. 8, line 2, "2 wherein" should be --2, wherein--.

Signed and Sealed this

Seventh Day of January, 1992

*Attest:*

HARRY F. MANBECK, JR.

*Attesting Officer*    Commissioner of Patents and Trademarks